(12) United States Patent
Ramachandra Iyer

(10) Patent No.: US 10,318,601 B2
(45) Date of Patent: Jun. 11, 2019

(54) METHOD AND SYSTEM FOR RENDERING MULTIMEDIA CONTENT BASED ON INTEREST LEVEL OF USER IN REAL-TIME

(71) Applicant: WIPRO LIMITED, Bangalore (IN)

(72) Inventor: Manjunath Ramachandra Iyer, Bangalore (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/712,544

(22) Filed: Sep. 22, 2017

(65) Prior Publication Data
US 2019/0050486 A1 Feb. 14, 2019

(30) Foreign Application Priority Data
Aug. 9, 2017 (IN) .............................. 201741028251

(51) Int. Cl.
| | |
|---|---|
| *G06F 16/78* | (2019.01) |
| *H04N 21/262* | (2011.01) |
| *H04N 21/462* | (2011.01) |
| *G06F 16/2453* | (2019.01) |
| *G06F 16/2455* | (2019.01) |

(Continued)

(52) U.S. Cl.
CPC ...... *G06F 16/9535* (2019.01); *G06F 16/2453* (2019.01); *G06F 16/2455* (2019.01); *G06F 16/78* (2019.01); *H04N 21/26258* (2013.01); *G06F 16/24573* (2019.01); *G06F 16/7867* (2019.01); *H04N 21/4622* (2013.01)

(58) Field of Classification Search
CPC ....... H04N 21/44218; H04N 21/42203; H04N 21/4223; H04N 21/44008; H04N 21/44222; H04N 21/4826; G06F 3/013; G06F 17/30817; G06F 17/3084; G06F 17/30867; G06F 3/0484; G06F 3/017; G06F 3/04842; G10L 21/003; G10L 21/02; G10L 21/057; H04H 60/37; H04H 60/45; H04H 60/46
See application file for complete search history.

(56) References Cited

U.S. PATENT DOCUMENTS 6,577,329 B1 * 6/2003 Flickner .................. G06F 3/013
715/774
9,361,373 B1 6/2016 Price
(Continued)

*Primary Examiner* — Hai V Tran
(74) *Attorney, Agent, or Firm* — Finnegan, Henderson, Farabow, Garrett & Dunner LLP

(57) ABSTRACT

The present disclosure relates to method and system for rendering multimedia content based on interest level of a user in real-time by a content rendering system. The content rendering system comprises detecting interest of user watching multimedia content, broadcasted by content provider based on set of parameters. The interest of user is on portion of multimedia content, determining metadata, object of interest, action and context from portion of multimedia content by processing image containing portion, generating search queries based on object of interest, action and context, extracting content similar to portion, broadcasted by one or more other content providers, based on search queries and metadata and combining extracted similar content with multimedia content currently viewed by user based on metadata to render multimedia content to user based on interest level of user in real-time. The present disclosure renders similar content from multiple content providers based on interest level of users.

21 Claims, 5 Drawing Sheets

(51) Int. Cl.
*G06F 16/2457* (2019.01)
*G06F 16/9535* (2019.01)

(56) References Cited

U.S. PATENT DOCUMENTS

| | | |
|---|---|---|
| 9,398,315 B2 | 7/2016 | Oks et al. |
| 9,450,821 B2 | 9/2016 | Garrett et al. |
| 2011/0208744 A1* | 8/2011 | Chandiramani .... G06F 17/3084 707/741 |
| 2015/0379132 A1* | 12/2015 | Cho .................. G06F 17/30867 707/722 |
| 2016/0210982 A1* | 7/2016 | Sherman ............... G10L 21/003 |
| 2017/0075994 A1 | 3/2017 | Barbieri et al. |

* cited by examiner

METHOD AND SYSTEM FOR RENDERING MULTIMEDIA CONTENT BASED ON INTEREST LEVEL OF USER IN REAL-TIME

TECHNICAL FIELD

The present subject matter is related in general to the field of multimedia content, more particularly, but not exclusively to method and system for rendering multimedia content based on interest level of user in real-time.

BACKGROUND

Over a last few years, there has been a tremendous increase in the volume as well as diversity of multimedia content generated by a multitude of sources. Exposed to a variety of content choices, users are exhibiting diverse preferences for content and their preferences often depend on the context in which they consume content. To satisfy the users demand for such diverse content, various content providers have emerged which gather content from numerous multimedia sources. Generally, the content providers capture live multimedia content such as, sports event, audio release event, television shows, and the like at any point of time and location. The content provider broadcasts the same live multimedia content to all the users. A key challenge presently for the content providers is td accurately predict what type of content each of its users prefer in a certain context, and adapt these predictions to the evolving user preferences, contexts and content characteristics.

In the existing systems, the content providers provide same content to all its users. However, the user who is currently viewing the content might not be equally interested in all parts/portions of the content, especially the live multimedia content. In such scenario, in case the content provider is not broadcasting the user interested portion or content, the user of the existing systems may every time search and cross check whether any other content providers are broadcasting the user interested portion or content. This makes the process time consuming and cumbersome. Hence, there is a need for a robust and efficient mechanism for automatically detecting interest level of the user in a certain portion of the content and seamlessly providing more information corresponding to the same content to the user.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for rendering multimedia content based on interest level of user in real-time. The method may comprise detecting an interest of a user watching a multimedia content, broadcasted by a content provider based on a set of parameters. The interest of the user is on a portion of the multimedia content. The method comprises determining metadata, an object of interest, an action and a context from the portion of the multimedia content by processing an image containing the portion, generating one or more search queries based on the object of interest, the action and the context, extracting content similar to the portion, broadcasted by one or more other content providers, based on the one or more search queries and the metadata and combining the extracted similar content with the multimedia content currently viewed by the user based on the metadata to render a multimedia content to the user based on the interest level of the user in real-time.

In an embodiment, the present disclosure relates to a content rendering system for rendering multimedia content based on interest level of user in real-time. The content rendering system comprises a processor and a memory communicatively coupled to the processor, where the memory stores processor executable instructions, which, on execution, may cause the content rendering system to detect an interest of a user watching a multimedia content, broadcasted by a content provider based on a set of parameters. The interest of the user is on a portion of the multimedia content. The content rendering system determines metadata, an object of interest, an action and a context from the portion of the multimedia content by processing an image containing the portion, generate one or more search queries based on the object of interest, the action and the context, extract content similar to the portion, broadcasted by one or more other content providers, based on the one or more search queries and the metadata and combine the extracted similar content with the multimedia content currently viewed by the user based on the metadata to render a multimedia content to the user based on the interest level of the user in real-time.

In an embodiment, the present disclosure relates to a non-transitory computer readable medium including instructions stored thereon that when processed by at least one processor may cause a content rendering system to detect an interest of a user watching a multimedia content, broadcasted by a content provider based on a set of parameters. The interest of the user is on a portion of the multimedia content. The instruction causes the processor to determine metadata, an object of interest, an action and a context from the portion of the multimedia content by processing an image containing the portion, generate one or more search queries based on the object of interest, the action and the context, extract content similar to the portion, broadcasted by one or more other content providers, based on the one or more search queries and the metadata and combine the extracted similar content with the multimedia content currently viewed by the user based on the metadata to render a multimedia content to the user based on the interest level of the user in real-time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
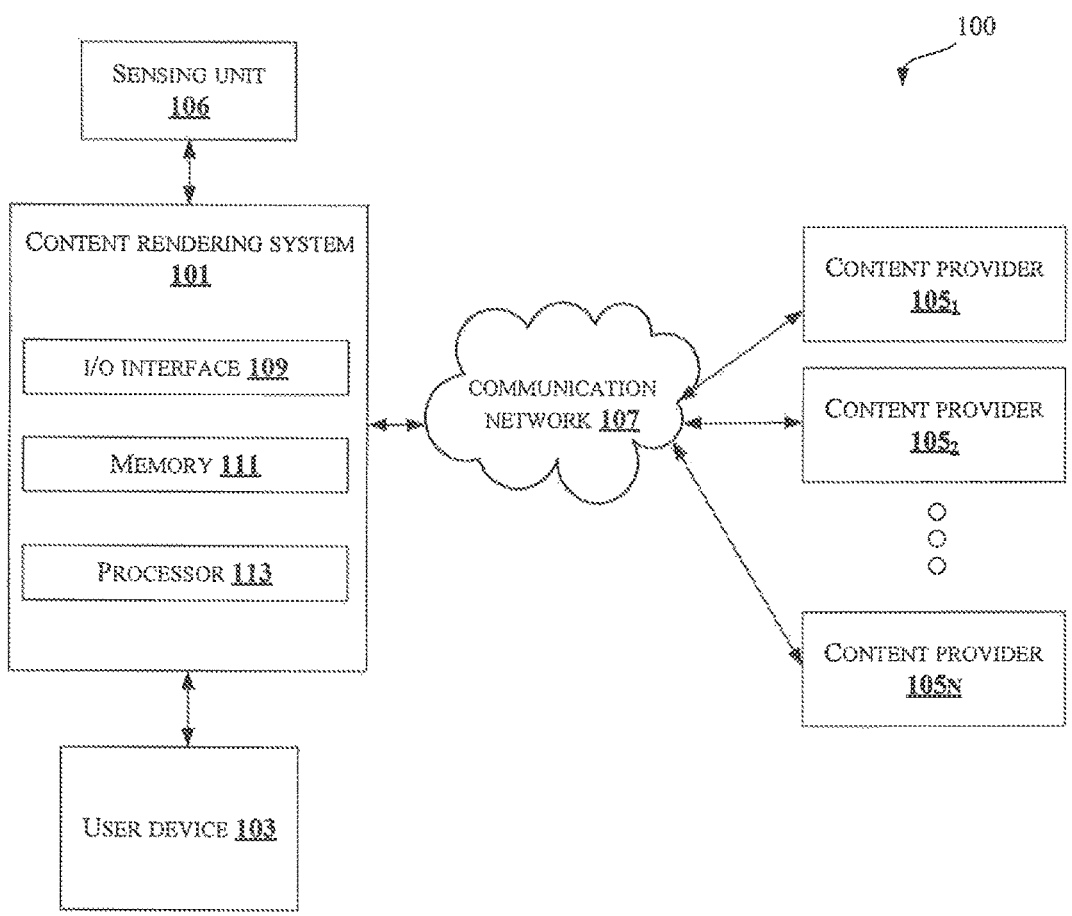
FIG. 1 illustrates an exemplary environment for rendering multimedia content based on interest level of a user in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a content rendering system for rendering multimedia content based on interest level of user in real-time. In an embodiment, the multimedia content may be a live data. Initially, the interest level of a user watching a multimedia content may be detected based on a set of parameters. In an embodiment, the user may be interested in a part/portion of the multimedia content. In an embodiment, the content rendering system may receive user related details from a plurality of sensors. In an embodiment, the plurality of sensors may be present in the user device. The user related details may be used for determining the set of parameters of the user. In an embodiment, the set of parameters may include eye gesture, point on a screen where the eye dwells, eye movement pattern, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice. On identifying the interested portion, an image containing the portion may be extracted and processed to determine metadata, an object of interest, a context and an action from the portion of the multimedia content. Based on the object of interest, the context and the action, one or more search queries may be identified. The one or more search queries and the metadata may be used to identify one or more content providers broadcasting content similar to the interested portion. The content similar to the portion may be extracted from the one or more content providers and combined with the content currently viewed by the user based on the metadata. In an embodiment, the combined content may be rendered to the user based on the interest of the user which is uniformly combined with the current content viewed by user in real-time. The content rendering system dynamically captures and interprets instantaneous preferences of the users and provides contents based on the preferences.

FIG. 1 illustrates an exemplary environment for rendering multimedia content based on interest level of a user in accordance with some embodiments of the present disclosure.

As shown in FIG. 1, the environment 100 includes a content rendering system 101 connected through a communication network 107 to a content provider $105_1$, a content provider $105_2$ . . . and a content provider 105N (collectively referred as plurality of content providers 105). In an embodiment, the plurality of content providers 105 may include local network television stations affiliates, cable television providers, telco, terrestrial and satellite television providers and the like. Each of the plurality of content providers 105 may broadcast a live multimedia content which may be rendered to users. A person skilled in the art would understand that any other content providers, not mentioned explicitly, may also be included in the present disclosure. The communication network 107 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The content rendering system 101 is connected to a user device 103 and a sensing unit 106. In an embodiment, the sensing unit 106 may be present inside the user device 103, in which the user is watching the multimedia content. In another embodiment, the sensing unit 106 may be present in the content rendering system 101. In an embodiment, the content rendering system 101 may be connected to the user device 103 through a communication network (not shown in FIG. 1, explicitly). In an embodiment, the user device 103 may include, but is not limited to, a web-enabled television, a laptop, a desktop computer, a Personal Digital Assistant (PDA), a notebook, a smartphone, a tablet, a server and any other computing devices. A person skilled in the art would understand that, any other user devices, not mentioned explicitly, may also be used in the present disclosure. The content rendering system 101 may render multimedia content to the user in real-time based on the interest level of the user. In an embodiment, the content rendering system 101 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used in the present disclosure.

Initially, the content rendering system 101 may detect an interest of the user while watching the multimedia content in the user device 103 based on a set of parameters. The user may be interested in a portion of the multimedia content. The content rendering system 101 may receive user related details from the sensing unit 106. In an embodiment, the user related details may include, eye movement details, voice related details and gesture details of the user. In an embodiment, the sensing unit 106 may include plurality of sensors for sensing the user related details. The plurality of sensors may include, but are not limited to, voice receiver, motion sensor, camera and the like. A person skilled in the art would understand that any other sensors for sensing the user related details, not mentioned explicitly, may also be included in the present disclosure. For example, the motion sensor may include eye tracking sensors, gyroscopes, accelerometer and the like. The voice receiver may include a microphone for receiving the voice of the user. The eye tracking sensors and camera may be used for detecting the eye movement of the user and the gyroscope, camera and accelerometer may be used for detecting any gestures made by the user. On receiving the user related details from the sensing unit 106, the content rendering system 101 may determine a set of parameters using the user related details. In an embodiment, the set of parameters may include, eye gesture, point on a screen where the eye dwells, eye movement pattern, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice. Once the set of parameters are determined, the content rendering system 101 may detect an interest of the user in a portion of the multimedia content currently viewed based on the set of the parameters. The content rendering system 101 may determine metadata, an object of interest, a context and an action from the portion by processing an image containing the portion. In an embodiment, the metadata of the portion may include, timestamp, frame data, content uploader name and location details associated with the multimedia content. A person skilled in the art would understand that any other metadata associated with the multimedia content, not mentioned explicitly may also be used in the present disclosure. Further, the content rendering system 101 may generate one or more search queries based on the object of the interest, the action and the context. In an embodiment, the one or more search queries may be generated to locate similar content from other content providers. In an embodiment, the one or more search queries may include, queries in form of text, image features and captions. Using the one or more queries and the metadata, the content rendering system 101 may extract content similar to the portion, broadcasted by the other one or more content providers. The content rendering system 101 may combine the extracted similar content with the multimedia content currently being viewed based on the metadata. Combining the content renders a multimedia content to the user which may be based on the interest level of the user in real-time. In an embodiment, the extracted similar content may be combined with the currently viewed multimedia content based on at least one of a spatial and temporal continuity between frames of the extracted similar content and the currently viewed multimedia content and the context and the action of the portion of the multimedia content. In an embodiment, the content rendering system 101 may remove duplicate content from the extracted similar content of the one or more other content providers before combining.

The content rendering system 101 may include an I/O Interface 109, a memory 111 and a processor 113. The I/O interface 109 may be configured to receive the user related details associated with the user from the plurality of sensors. The I/O interface 109 may also receive content similar to the portion from the other one or more content providers.

The information received from the I/O interface 109 may be stored in the memory 111. The memory 111 may be communicatively coupled to the processor 113 of the content rendering system 101. The memory 111 may also store processor instructions which may cause the processor 113 to execute the instructions for rendering multimedia content based on interest level of a user.

Figure 2:
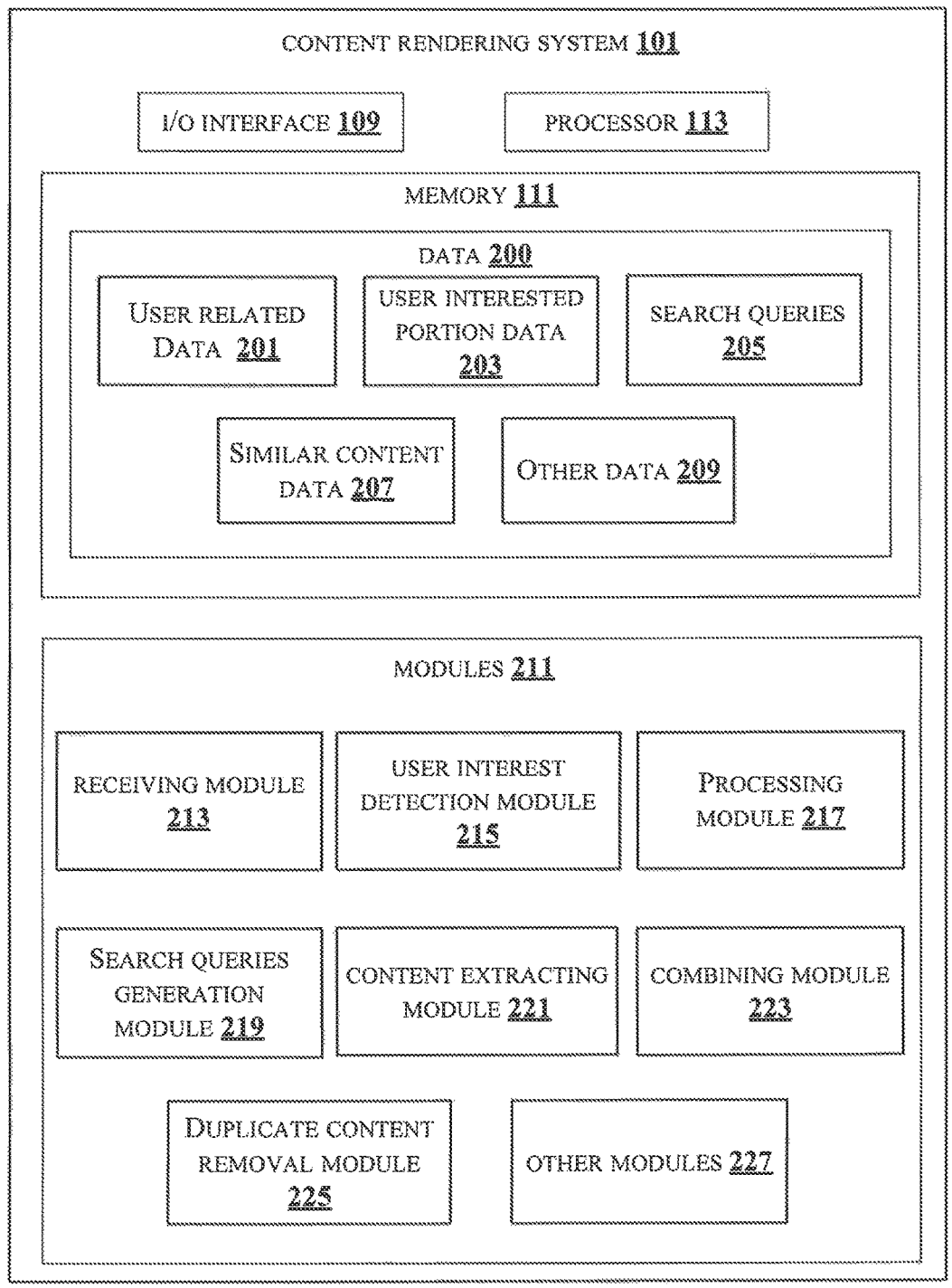
FIG. 2 shows a detailed block diagram of a content rendering system in accordance with some embodiments of the present disclosure.

FIG. 2 shows a detailed block diagram of a content rendering system in accordance with some embodiments of the present disclosure.

Data 200 and one or more modules 211 of the content rendering system 101 are described herein in detail. In an embodiment, the data 200 may include user related data 201, user interested portion data 203, search queries 205, similar content data 207 and other data 209.

The user related data 201 may include the user related details observed in the user while watching the multimedia content. The user related details may include, eye movement details, voice related details and gesture details of the user. The user related details may be received from the sensing unit 106. Further, the user related data 201 may include the set of parameters determined from the user related details. The set of parameters may include, details about eye gesture of the user, point on a screen where the eye dwells, eye movement pattern of the user, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice.

The user interested portion data 203 may include details about the portion of the content in which the user is interested. The details may include metadata, the object of interest, context and action associated with the portion of the multimedia content. The user interested portion may be detected based on the set of parameters.

The search queries 205 may include details about the one or more search queries generated for the portion of the multimedia content. The one or more search queries may be generated based on the context, the object of interest and the action associated with the portion of the multimedia content. In an embodiment, the search queries 205 may be in text forms, image feature form and in caption form.

The similar content data 207 may include details about the content similar to the interested portion of the multimedia content. The similar content data 207 may be extracted from the other one or more content providers broadcasting the similar content. In an embodiment, the details about the similar content may include metadata information.

The other data 209 may store data, including temporary data and temporary files, generated by modules 211 for performing the various functions of the content rendering system 101.

In an embodiment, the data 200 in the memory 111 are processed by the one or more modules 211 of the content rendering system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 211 when configured with the functionality defined in the present disclosure will result in a novel hardware.

In one implementation, the one or more modules 211 may include, but are not limited to a receiving module 213, user interest detection module 215, a processing module 217, a search queries generation module 219, a content extraction module 221, a combining module 223 and a duplicate content removal module 225. The one or more modules 211 may also include other modules 227 to perform various miscellaneous functionalities of the content rendering system 101. It will be appreciated that such modules 211 may be represented as a single module or a combination of different modules 211.

The receiving module 213 may receive the user related details from the sensing unit 106. In an embodiment, the sensing unit 106 may be placed in the user device 103. In another embodiment, the sensing unit 106 may be placed in the content rendering system 101. The user related details may include, eye movement details, voice related details and gesture details of the user. In an embodiment, the plurality of sensors in the sensing unit 106 senses the user related details such as, eye movement, voice and gestures while the user may be watching the multimedia content.

The user interest detection module 215 may determine the set of parameters of the user based on the user related details received. The set of parameters may include at least one of details of eye gesture of the user, point on a screen where the eye of the user dwells, eye movement pattern of the user, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice. Once the set of parameters are determined, the user interest detection module 215 may detect the interest of the user in the portion of the multimedia content being watched by the user in real-time. In an embodiment, the interest level of the user in the portion of the multimedia content may be detected both spatially and temporally based on the set of parameters determined. In an embodiment, the emotions of the user may be parameterized into percentage of one or more emotions such as, happy, sad, angry and the like. The parameters may take values between "0" and "1". In an embodiment, the emotion while watching the multimedia content may get fused with a Bayesian network. The emotions of the user may be read together with coordinates of user interest to obtain an indication of user interest level in the scene. In an embodiment, Brian Computer Interface (BCI) may be used to estimate the interest level of the user. In another embodiment, the user may explicitly mention the interest level by providing the voice input with or without a pointing finger. In an example, the user may provide voice input such as, "show frames/content that includes the red shirt person".

The processing module 217 may determine the metadata, the object of interest, the context and the action from the portion of the multimedia content. The metadata for the multimedia content may include, timestamp, frame data and location details associated with the currently viewed multimedia content. A person skilled in the art would understand that any other metadata associated with the multimedia content may also be included in the present disclosure. In an embodiment, the metadata may be derived from a plurality of techniques. In an embodiment, every content provider adheres to one or the other standards. In one example, the video content adheres to International Federation of Television Archives (IFTA©) standard, which mentions timing information of content explicitly. In another example, standard such as, Digital Video Broadcasting (DVB™) may define Time Date Table (TDT). In an embodiment, in public content such as, "You tube" video, the date and time may be extracted from one or more Application Programming Interfaces (APIs).

Further, the processing module 217 may determine the object of interest in the portion of the multimedia content. Based on the portion of the multimedia content in which the user may be interested, the processing module 217 may extract the image containing the portion. In an embodiment, the image extracted from the portion may be subjected to object extraction and segmentation. In an embodiment, the object on which eyes of the user is focused may be extracted based on the level set or based on a region segmentation. Further, metadata of the object of interest may be used for further search. For example, the user may be focusing on a red shirt person in the scene. In an embodiment, the objects in the scene may be determined using a Convolutional Neural Network. Once the object of interest is extracted, the processing module 217 may determine the identity of the object of interest by performing search in one or more data sources. For example, the identity of the red shirt person in the scene may be identified as a known figure such as, "Ballack".

Further, the processing module 217 may determine the actions associated with the portion of the multimedia content. In an embodiment, the action may be detected through scene description implementation with a Long short-term memory (LSTM) network. A person skilled in the art would understand that any other network, not mentioned explicitly, may also be used for determining the action in the portion of multimedia content in the present disclosure. For example, the interest level of the user on the red shirt person is now translated to "Ballack throwing ball into goal". In another example, consider the user expresses the interest with spoken words "show me more on red shirt player/person actions". In such case, initially, the speech may be converted to text and the objects and action of the text are mapped to objects and actions in the scene using the LSTM network. Further, details of the object may be retrieved by searching the one or more data sources. In an embodiment, the audio associated with the video content may also help in providing the context, for example: "Basketball game today at rock garden stadium".

The search queries generation module 219 may generate one or more search queries based on the object of the interest, the context and the action determined for the portion of the multimedia content. In an embodiment, the one or more queries may be generated contextually. For example, "show me the ball hitting the goal by red shirt person" or "show me how the red shirt person is running behind the ball".

The content extracting module 221 may extract content similar to the portion from the other one or more content providers broadcasting the similar content. The content extracting module 221 may extract the similar content based on the one or more search queries and the metadata. For example, the time, date, frame details and location of the portion of the multimedia content may be matched with data of content from the other one or more content providers.

The combining module 223 may combine, the extracted similar content from the other one or more content providers with the portion of the multimedia content currently being viewed by the user, using the metadata. In an embodiment, the combining module 223 may combine the content seamlessly without discontinuities of the context. In an embodiment, the combining module 223 may use spatial object topography for combining the content. A person skilled in the art would understand that any other technique for combining, not mentioned explicitly, may also be used in the present disclosure. In an embodiment, the combining module 223 may combine the extracted similar content with the currently viewed multimedia content based on at least one of a spatial and temporal continuity between frames of the extracted similar content and the currently viewed multimedia content and the context and the action of the portion of the multimedia content. For example, in spatial continuity, the objects in the next scene, fetched from other content provider are expected to be spatially closer to what is being watched to endure spatial continuity. The spatial continuity may be achieved based on the frame details of the portion of the multimedia content and the frame details of the content to be combined from the other content provider. Similarly, for the temporal continuity, the combining module 223 may buffer the content being watched and combine the extracted content from the one content provider with the currently viewed buffered content uniformly. In an example, when the user is watching TV news, the user may be interested in war news and in the scene, the user may be further interested in bombing of buildings. Subsequently, the user is provided with more information such as, scenes, commentary and the like on the bombing of buildings by adaptively browsing and seamlessly combining the content with the present scene.

The duplicate content removal module 225 may remove the content which are repeated in the other one or more content providers. In an embodiment, the duplicates are removed by comparing the image features using the Convolution Neural Network. In an embodiment, the duplicate content removal module 225 may remove nearly matching content.

Figure 3:
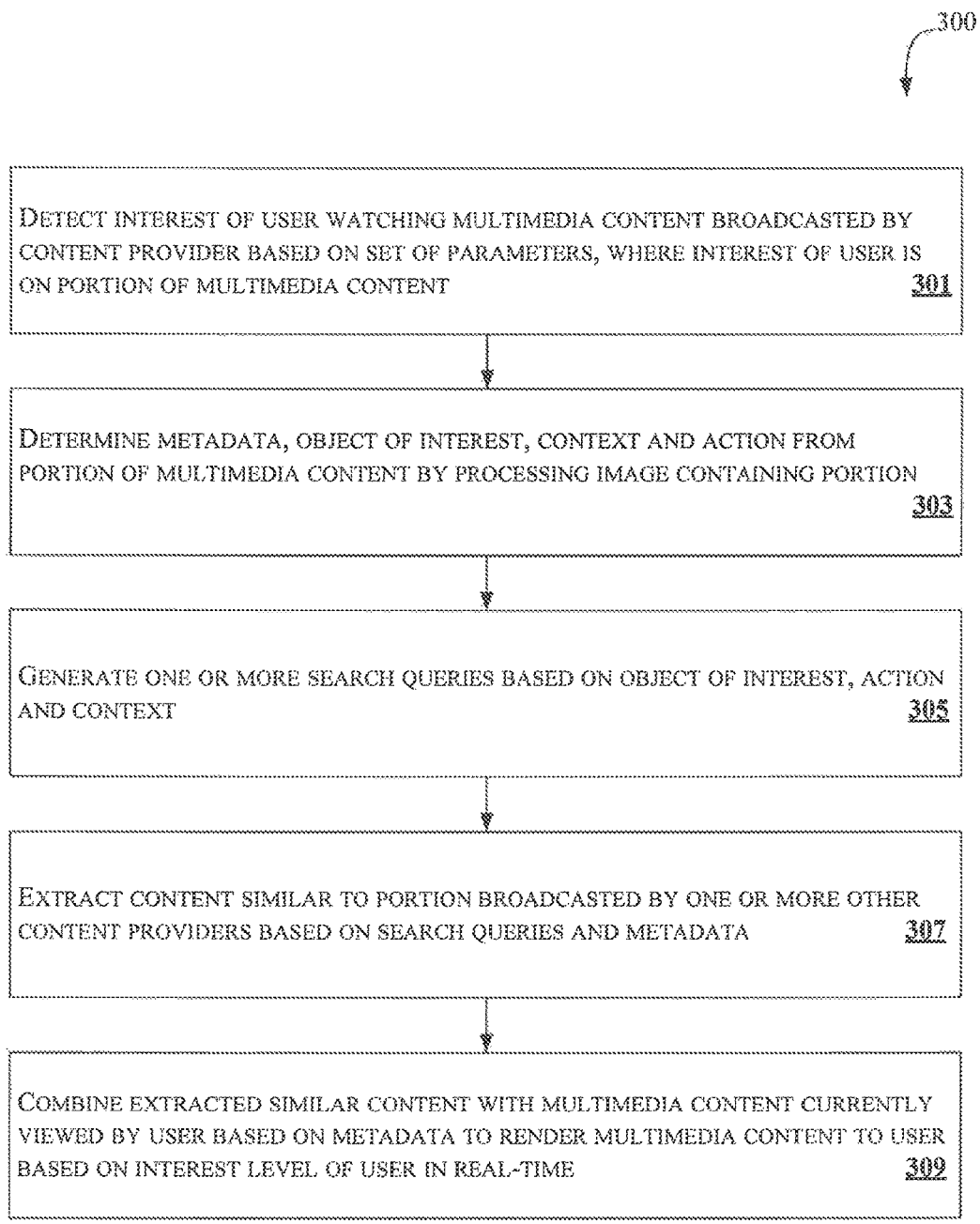
FIG. 3 illustrates a flowchart showing a method for rendering multimedia content based on interest level of a user in accordance with some embodiments of present disclosure.

FIG. 3 illustrates a flowchart showing a method for rendering multimedia content based on interest level of a user in accordance with some embodiments of present disclosure.

As illustrated in FIG. 3, the method 300 includes one or more blocks for rendering multimedia content based on interest level of a user in real-time. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, detecting, by the user interest detection module 215, the interest of the user watching the multimedia content broadcasted by a content provider based on the set of parameters. The interest of the user may be on portion of the multimedia content. In an embodiment, the user interest detection module 215 determines the set of parameters based on the user related details received by the receiving module 213 from the sensing unit 106.

In an embodiment, the set of parameters may include eye gesture, point on a screen where the eye dwells, eye movement pattern, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice.

At block 303, determining, by the processing module 217, the metadata, the object of interest, the action and the context from the portion of the multimedia content by processing the image containing the portion.

At block 305, generating, by the search queries generation module 219, the one or more search queries based on the object of interest, the action and the context.

At block 307, extracting, by the content extracting module 221, the content similar to the portion, broadcasted by the one or more other content providers, based on the one or more search queries and the metadata. In an embodiment, the duplicate content removal module 225 may remove the duplicate content in the content extracted from the other one or more content providers.

At block 309, combining, by the combining module 223, the extracted similar content with the multimedia content currently viewed by the user based on the metadata to render the multimedia content to the user based on the interest level of the user in real-time.

Figure 4:
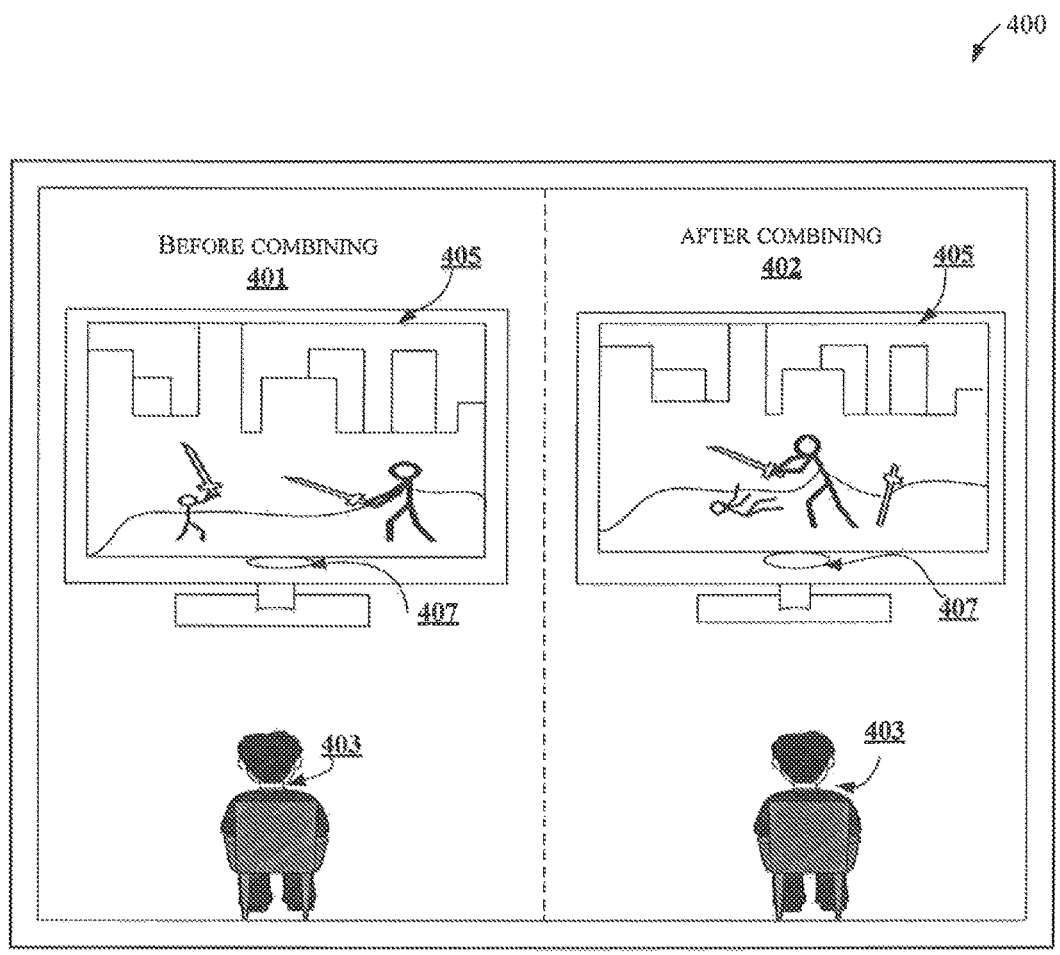
FIG. 4 shows an exemplary representation for rendering multimedia content based on interest level of a user in accordance with some embodiments of the present disclosure.

FIG. 4 shows an exemplary representation for rendering multimedia content based on interest level of a user in accordance with some embodiments of the present disclosure.

As shown in FIG. 4, the environment 400 illustrates a scenario of a user watching multimedia content in an exemplary embodiment of the present disclosure. The environment 400 includes two scenarios namely, before rendering the interested multimedia content, termed as "before combining 401 or first scenario 401" and during rendering the interested multimedia content to the user, termed as "after combining 402 or second scenario 402". Both the scenarios include a user 403 watching a multimedia content on a user device i.e. television 405. The television 405 includes a sensing unit 407. The sensing unit 407 includes an eye tracking sensor, a microphone and a gyroscope (not shown explicitly in FIG. 4). A person skilled in the art would understand that the user device may include any other sensors, not mentioned explicitly in the present disclosure. The television 405 may be connected to the content rendering system 101 (not shown explicitly in the FIG. 4). A person skilled in the art would understand that FIG. 4 is an exemplary embodiment, and the present disclosure may include any other user devices, not mentioned explicitly in the present disclosure. Initially, when the user 403 is watching the multimedia content on the television 405, the sensing unit 407 may sense the user related details of the user 403 while watching the multimedia content. In an embodiment, the user related details may include, eye movement details, voice details and gesture details. The content rendering system 101 may receive the user related details of the user 403 and determines the set of parameters based on the user related details. The set of parameters may include, eye gesture, point on a screen where the eye dwells, eye movement pattern, eye movement speed, duration of the eye dwell on a portion of the content, emotions of the users while watching the content, voice input, pointing fingers, voice gesture, voice pattern, speed at which the user speaks a sentence, duration of voice on each word in the sentence, pitch and intensity of the voice. The content rendering system 101 uses the set of parameters for detecting the interest level of the user 403. For example, consider that in the first scenario 401, the user 403 is watching an advertisement. While watching the advertisement, the user 403 eye movement is stuck to a portion in the advertisement, where two people are fighting using swords as shown in the first scenario 401. The content rendering system 101 detects the interest of the user 403 in the portion "where the two people are fighting using swords" based on the eye movement and other set of parameters of the user 403. Once the portion is detected in which the user 403 is interested, the content rendering system 101 may determine the metadata, the object of interest, action and context from the portion of the advertisement by extracting an image from the portion and processing the image. In this scenario, the content rendering system 101 extracts the image where the two people are fighting using the swords. Using the image, the content rendering system 101 determines the time, location and frame details associated with the advertisement. For example, the advertisement may be generated on 1 Jan. 2010 at 5 .PM. Further, the content rendering system 101 determines the context of the advertisement as "fight scene" and the action in the portion is "two people fighting using swords". Once the metadata, object of interest, context and the action is determined, the content rendering system 101 may generate one or more search queries for the portion. The one or more search queries and the metadata are used for extracting the similar content, where the two people are fighting using swords, from other one or more content providers to which the content rendering system 101 is connected. Once the similar content is extracted from the other one more one content providers, the content rendering system 101 combines the extracted content with the currently viewed advertisement uniformly based on the frame details, time, location and date of the portion in the advertisement. The combined multimedia content comprising the similar advertisement in which the user was interested is shown in the second scenario 402. As shown in second scenario 402, the user 403 views the similar content where the two people are fighting using sword. The content rendering system 101 renders more data and content to the user 403 relating to the advertisement by combining the content uniformly.

Figure 5:
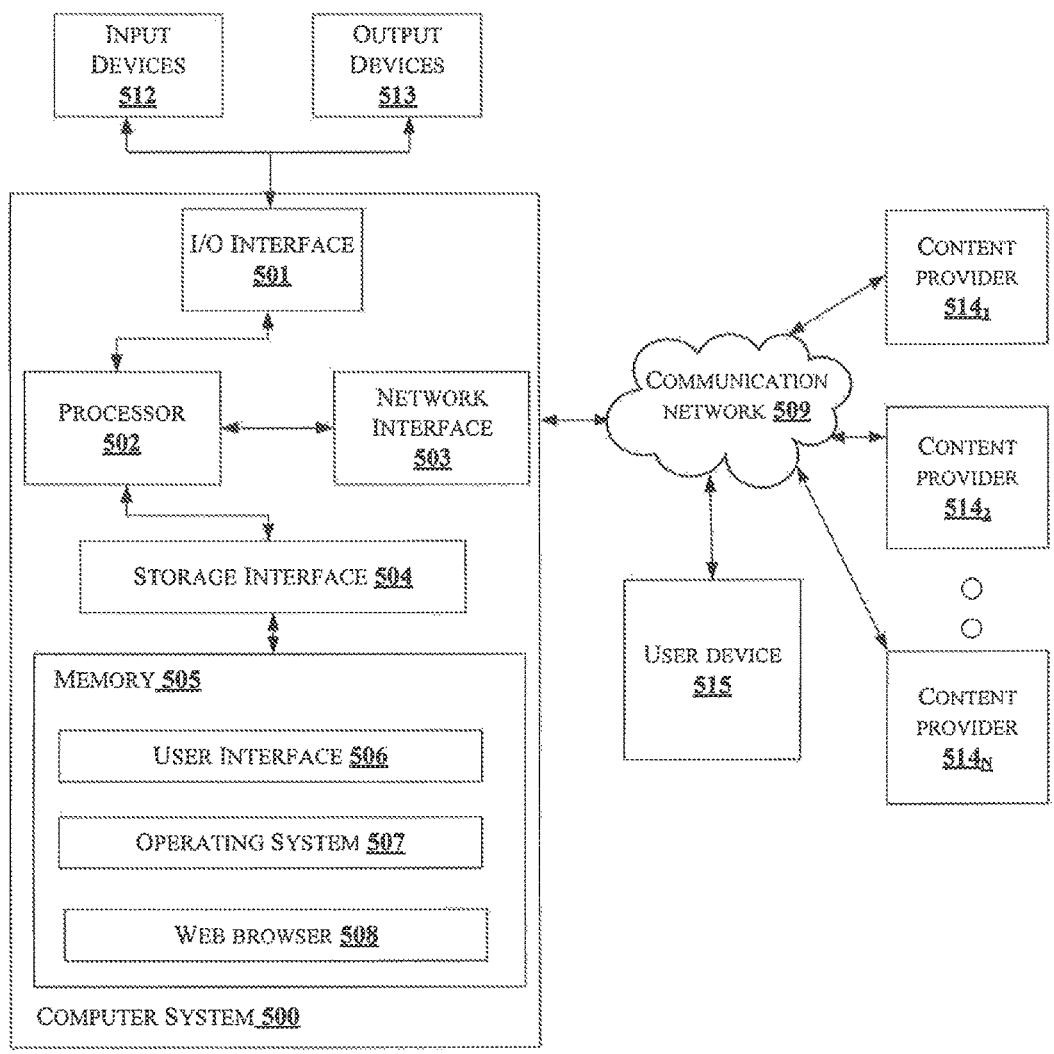
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the content rendering system 101. The computer system 500 may include a central processing unit ("CPU" or "processor") 502. The processor 502 may include at least one data processor for rendering multimedia content based on interest level of a user in real-time. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a content rendering system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a content provider 514₁, a content provider 514₂, . . . and a content provider 514$_N$ (collectively referred as plurality of content providers 514) and a user device 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure dynamically captures and interprets instantaneous preferences of the user from among the content being consumed.

An embodiment of the present disclosure fetches similar content from multiple content providers based on interest level of users.

An embodiment of the present disclosure blends the content extracted from multiple content providers seamlessly in real-time.

An embodiment of the present disclosure dynamically captures the user preferences and attention level based on a set of parameters.

An embodiment of the present disclosure searches and renders the same content which is of interest of user on the fly without the knowledge of the user.

An embodiment of the present disclosure smoothly blends the content being provided to users maintaining continuity, context, and eliminating repetitions.

An embodiment of the present disclosure learns user behavior and preferences which helps to prioritize the content providers.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include e suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Content rendering system |
| 103 | User device |
| 105 | Plurality of content providers |
| 107 | Communication network |
| 109 | I/O interface |
| 111 | Memory |
| 113 | Processor |
| 200 | Data |
| 201 | User related data |
| 203 | User interested portion data |
| 205 | Search queries |
| 207 | Similar content data |
| 209 | Other data |
| 211 | Modules |
| 213 | Receiving module |
| 215 | User interest detection module |
| 217 | Processing module |
| 219 | Search queries generation module |
| 221 | Content extracting module |
| 223 | Combining module |
| 225 | Duplicate content removal module |
| 227 | Other modules |

I claim:

1. A method for rendering multimedia content based on interest level of a user in real-time, the method comprising:

detecting, by a content rendering system, an interest of a user watching a multimedia content, broadcasted by a content provider based on a set of parameters, wherein the interest of the user is on a portion of the multimedia content;

determining, by the content rendering system, metadata, an object of interest, an action, and a context from the portion of the multimedia content by processing an image containing the portion;

generating, by the content rendering system, one or more search queries based on the object of interest, the action, and the context;

extracting, by the content rendering system, content similar to the portion, broadcasted by one or more other content providers, based on the one or more search queries and the metadata; and combining, by the content rendering system, the extracted similar content with the multimedia content currently viewed by the user based on the metadata, the interest level of the user in real-time, and a spatial and temporal continuity between frames of the extracted similar content and the currently viewed multimedia content, to render a combined multimedia content to the user.

2. The method as claimed in claim 1, wherein the set of parameters comprises at least one of an eye gesture, a point on a screen where the eye dwells, an eye movement pattern, an eye movement speed, a duration of the eye dwell on a portion of the content, emotions of the users while watching the content, a voice input, pointing fingers, a voice gesture, a voice pattern, a speed at which the user speaks a sentence, a duration of voice on each word in the sentence, a pitch and a intensity of the voice.

3. The method as claimed in claim 1, wherein the metadata comprises at least one of a timestamp, a frame data, and location details associated with the currently viewed multimedia content.

4. The method as claimed in claim 1, wherein the set of parameters are determined using user related details received from at least one of motion sensor, camera and voice receiver of the content rendering system.

5. The method as claimed in claim 4, wherein the user related details comprise n eye movement, a voice and gestures details of the user while watching the multimedia content.

6. The method as claimed in claim 1, further comprising removing duplicate content from the extracted similar content of the one or more other content providers.

7. The method as claimed in claim 1, wherein combining the extracted similar content with the currently viewed multimedia content is further based on the context and the action of the portion of the multimedia content, wherein the spatial continuity is based on spatial object topography on frame details of the portion of the currently viewed multimedia content and frame details of the extracted similar content from the other content provider; and wherein the temporal continuity is based on buffering of the currently viewed multimedia content and then combining the extracted similar content from the other content provider with the buffered content.

8. A content rendering system for rendering multimedia content based on interest level of a user in real-time, comprising:

a processor; and a memory communicatively coupled to the processor, wherein the memory stores processor instructions, which, on execution, causes the processor to:

detect an interest of a user watching a multimedia content, broadcasted by a content provider based on a set of parameters, wherein the interest of the user is on a portion of the multimedia content;

determine metadata, an object of interest, an action and a context from the portion of the multimedia content by processing an image containing the portion;

generate one or more search queries based on the object of interest, the action and the context;

extract content similar to the portion, broadcasted by one or more other content providers, based on the one or more search queries and the metadata; and combine the extracted similar content with the multimedia content currently viewed by the user based on the metadata, the interest level of the user in real-time, and a spatial and temporal continuity between frames of the extracted similar content and the currently viewed multimedia content, to render a combined multimedia content to the user.

9. The content rendering system as claimed in claim 8, wherein the set of parameters comprises at least one of a eye gesture, a point on a screen where the eye dwells, a eye movement pattern, an eye movement speed, a duration of the eye dwell on a portion of the content, emotions of the users while watching the content, a voice input, pointing fingers, a voice gesture, a voice pattern, a speed at which the user speaks a sentence, a duration of voice on each word in the sentence, a pitch and an intensity of the voice.

10. The content rendering system as claimed in claim 8, wherein the metadata comprises at least one of a timestamp, a frame data, and location details associated with the currently viewed multimedia content.

11. The content rendering system as claimed in claim 8, wherein the set of parameters are determined using user related details received from at least one of a motion sensor, a camera, and a voice receiver of the content rendering system.

12. The content rendering system as claimed in claim 11, wherein the user related details comprise an eye movement, a voice and gestures details of the user while watching the multimedia content.

13. The content rendering system as claimed in claim 8, wherein the processor removes duplicate content from the extracted similar content of the one or more other content providers.

14. The content rendering system as claimed in claim 8, wherein the processor combines the extracted similar content with the currently viewed multimedia content, further based on the context and the action of the portion of the multimedia content,
wherein the spatial continuity is based on spatial object topography on frame details of the portion of the currently viewed multimedia content and frame details of the extracted similar content from the other content provider; and
wherein the temporal continuity is based on buffering of the currently viewed multimedia content and then combining the extracted similar content from the other content provider with the buffered content.

15. A non-transitory computer readable medium including instruction stored thereon that when processed by at least one processor cause a content rendering system to perform operation comprising:
detecting an interest of a user watching a multimedia content, broadcasted by a content provider based on a set of parameters, wherein the interest of the user is on a portion of the multimedia content;
determining metadata, an object of interest, an action and a context from the portion of the multimedia content by processing an image containing the portion;
generating one or more search queries based on the object of interest, the action and the context;
extracting content similar to the portion, broadcasted by one or more other content providers, based on the one or more search queries and the metadata; and
combining the extracted similar content with the multimedia content currently viewed by the user based on the metadata, the interest level of the user in real-time, and a spatial and temporal continuity between frames of the extracted similar content and the currently viewed multimedia content, to render a combined multimedia content to the user.

16. The medium as claimed in claim 15, wherein the set of parameters comprises at least one of a eye gesture, a point on a screen where the eye dwells, an eye movement pattern, an eye movement speed, a duration of the eye dwell on a portion of the content, emotions of the users while watching the content, a voice input, pointing fingers, a voice gesture, a voice pattern, a speed at which the user speaks a sentence, a duration of voice on each word in the sentence, a pitch and an intensity of the voice.

17. The medium as claimed in claim 15, wherein the metadata comprises at least one of a timestamp, a frame data, and location details associated with the currently viewed multimedia content.

18. The medium as claimed in claim 15, wherein the set of parameters are determined using user related details received from at least one of a motion sensor, a camera, and a voice receiver of the content rendering system.

19. The medium as claimed in claim 18, wherein the user related details comprise n eye movement, a voice, and gestures details of the user while watching the multimedia content.

20. The medium as claimed in claim 15, further comprising removing duplicate content from the extracted similar content of the one or more other content providers.

21. The medium as claimed in claim 15, wherein combining the extracted similar content with the currently viewed multimedia content is further based on the context and the action of the portion of the multimedia content,
wherein the spatial continuity is based on spatial object topography on frame details of the portion of the currently viewed multimedia content and frame details of the extracted similar content from the other content provider; and
wherein the temporal continuity is based on buffering of the currently viewed multimedia content and then combining the extracted similar content from the other content provider with the buffered content.

* * * * *